Jan. 18, 1927.
E. J. BABBITT
1,614,642
FISHING LINE
Filed Feb. 4, 1926
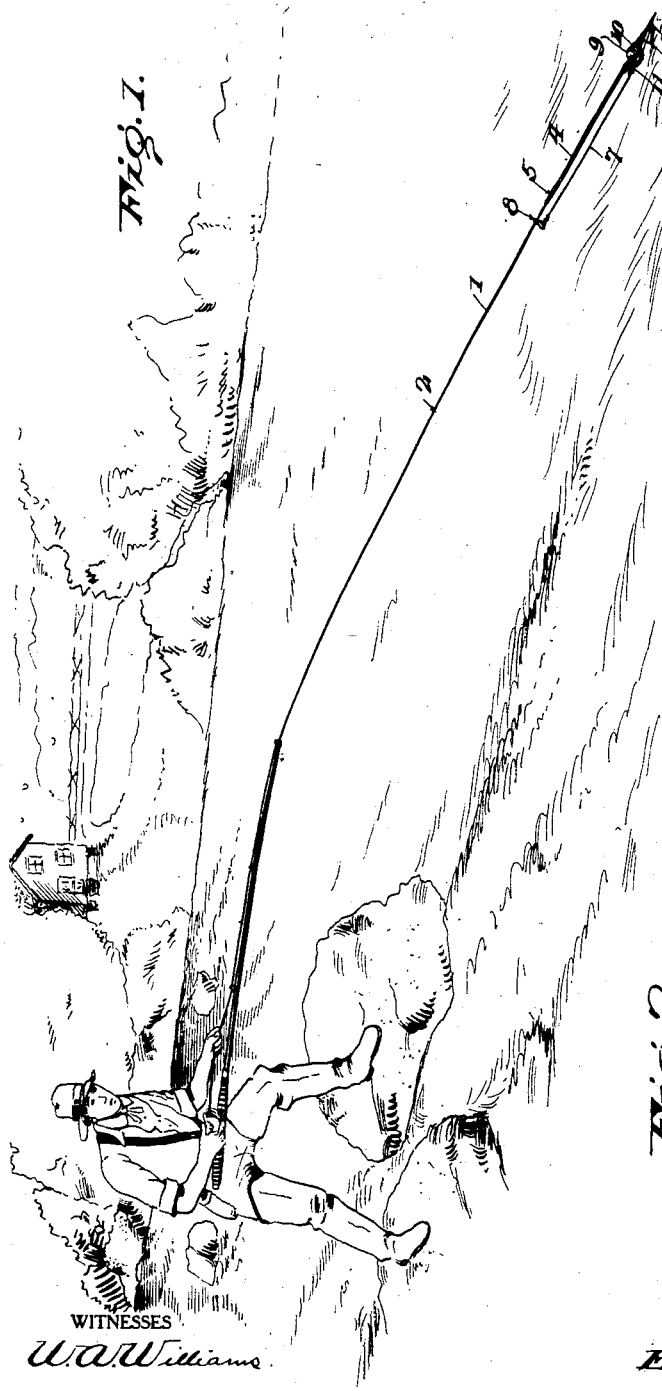
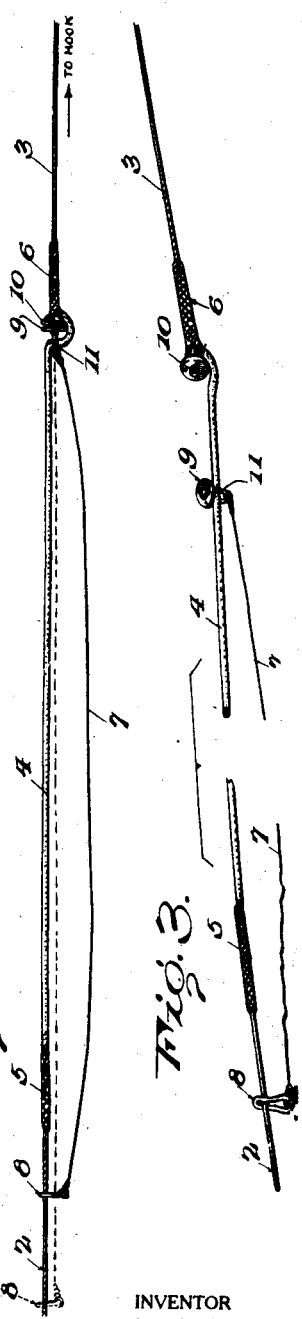
INVENTOR
E. J. Babbitt.
BY
ATTORNEYS Patented Jan. 18, 1927.

1,614,642

UNITED STATES PATENT OFFICE.

ELWIN J. BABBITT, OF HOLLAND, MICHIGAN.

FISHING LINE.

Application filed February 4. 1926. Serial No. 86,045.

This invention relates to an improvement in fishing lines, more particularly to improved trolling lines.

The object of the invention is to provide a fishing line which is sufficiently rigid and inextensible to prevent the fish from throwing the hook out of his mouth when caught but which under a predetermined strain brings into play an elastic element which renders the line elastic to prevent breaking or snapping of the line and loss of the equipment and fish.

A further object of the invention resides in the provision of a fishing line having these advantages and capacities which is simple and durable in construction, reliable and effective in operation and easy and comparatively inexpensive to manufacture.

Other objects and advantages reside in certain novel features of the construction, arrangement and combination of parts which will be hereinafter more fully described and paticularly pointed out in the appended claims, reference being had to the accompanying drawings forming a part of this specification, and in which:

Figure 1 is a perspective view showing a fishing line embodying the present invention in use, Figure 2 is a fragmentary view in elevation showing the improved elements of the line in one position of the same, and Figure 3 is a fragmentary perspective view showing another position of the parts illustrated in Figure 2.

Referring to the drawings, the numeral 1 designates a fishing line which has inextensible sections 2 and 3 and an elastic or extensible section 4 connecting the sections 2 and 3. The elastic section 4 consists of interwoven strands of rubber cords or the like and is permanently united to the sections 2 and 3, as indicated at 5 and 6.

An inextensible connecting element or cord 7 is also provided between the sections 2 and 3 and has one end suitably fixed and secured to the section 2. In the embodiment illustrated the end of the section 7 secured to the section 2 is adjustably fixed thereto by means of a V-shaped eye 8 which may be caused to grip and bind the section 2. In lieu of the eye 8 the end of the section 7 may be tied or otherwise suitably fastened to the section 2. The opposite end of the connecting element 7 from that secured to the section 2 is releasably fastened to the section 3 preferably by means of a snap fastener arrangement including a resilient socket 9 and a stud 10, the socket 9 having an eye 11 fastened to one end of the connecting element 7 and the stud 10 being secured to the inextensible section 3 or to the connection 7 between such extensible section 3 and the elastic section 4.

In use the complementary parts 9 and 10 of the snap fastener arrangement are interengaged, as shown in Figure 2, and then the line 6 trolled or used in the ordinary fashion. When a fish strikes the hook which is connected up to the section 3 the advantage of a substantially inextensible fishing line is secured so that the hook is imbedded in the mouth of the fish and cannot be thrown out as it might if the line were slack or extensible at this time. However, when the fish lunges away with considerable force the complementary parts 9 and 10 of the snap fastener arrangement are pulled apart to disconnect the inextensible element 7 from the section 3 of the line, thereby bringing into play the elastic section 4, preventing the line from snapping or breaking and permitting the fish to play itself out and eventually to be hauled in. It is to be noted that the inextensible element or the cord 7 is substantially the same length as the elastic section 4 of the fishing line.

I claim:—

1. A fishing line made up of inextensible sections and an elastic section connecting the inextensible sections, an inextensible connecting element substantially equal in length to the normal length of the elastic section having one end secured to one of the inextensible sections and having a connection with the other inextensible section releasable upon a certain pull upon said line.

2. A fishing line including inelastic sections and an elastic section, an inextensible connecting element between the inelastic sections substantially equal to the normal length of the elastic, said inextensible connecting element having a connection with one of said inelastic sections releasable upon a certain pull upon the line.

3. A fishing line including inextensible sections and an elastic section between said inextensible sections, and an inextensible connecting element substantially equal in length to the normal length of the elastic having one end secured to one of the extensible sections, and a snap fastener arrangement between the other end of the inextensible connecting element and the other inextensible section.

4. A fishing line including inextensible sections and an elastic section between said inextensible sections, an inextensible connecting element between said inextensible sections substantially equal in length to the normal length of the elastic, means for adjustably fixing one end of the inextensible connecting element to one of the inextensible sections, and a snap fastener arrangement between the other end of the inextensible connecting element and the other inextensible section.

ELWIN J. BABBITT.